INVENTOR.
Wilfrid H. Bendall

United States Patent Office 2,770,143
Patented Nov. 13, 1956

2,770,143

FLEXIBLE LINK CHAIN

Wilfrid H. Bendall, New York, N. Y.

Application February 12, 1951, Serial No. 210,586

10 Claims. (Cl. 74—245)

This invention relates generally to drive chains for power transmission purposes. In particular the present application is a continuation-in-part of my copending application Serial Number 596,672, filed May 30, 1945, now Patent No. 2,551,578, dated May 8, 1951, and is a further development of the flexible link chain principles and constructional ideas described in a related United States patent, No. 2,062,115, issued to me November 24, 1936.

As is well-known to those skilled in the art, and as set forth in the copending application, the rigid link chains in use at the present time may be considered a relatively uneconomical power transmission medium in the light of modern drive requirements. For operation at low speeds such chains are needlessly refined and expensive. At higher speeds the pin-bearing limitations, weight and destructive impact, inherent in the rigid link operating principle, again prevent effective use of a high intrinsic strength and refined manufacture.

The flexible link chain avoids these difficulties by utilizing functionally flexible, relatively light and resilient, link members. Such link members enable a substantially continuous flexural chain action in place of the articulated, angularly fluctuating action of the rigid link chains.

As reference to the abovementioned copending application will show, flexible link chain construction is generally characterized by the use of an interconnected series of flexible link members adapted to conform to a circular sprocket engagement pitch line and having apertures for clearing the drive sprocket teeth, and sprocket engaging link portions, such portions being either separate or integral parts of the link members. Drive sprockets proposed for these chains generally specify sprocket teeth of special form and supporting rims or rim portions for maintaining the chain at a substantially constant drive radius.

In view of the fully standardized manufacture and extensive production and marketing facilities of the rigid link chains, however, it becomes highly desirable that new flexible link chain proposals, such as those of the present invention, utilize such facilities to the fullest possible extent. The well-known roller-type drive chain and sprockets, for example, as built by a number of manufacturers to the industry approved standards of the American Standards Association, constitute a chain drive medium of practically world wide use and availability. Drive sprockets for these chains are obtainable from every manufacturer of gears and related power transmission components. It is thus apparent that a flexible link chain able to suplement and replace the standard roller chain without requiring modification of either the drive sprockets or the customary installation practice, would have greatly enhanced economic and technical value.

It is accordingly a major object of the present invention to provide a flexible link chain adapted for efficient operation on standard roller chain sprockets.

Additional important objects of this invention are: to provide flexible link chains of wider operating speed and horsepower range than equivalent size conventional roller chains; to provide a flexible link chain of simple design and construction; a chain more economical to manufacture, install and operate than the standard roller chain, and more versatile and efficient in performance.

These and other objects and advantages of this invention will be apparent from the ensuing description of its construction and operating principle, and from reference to the accompanying drawings in which, Fig. 1 is a perspective view of an interconnecting flexible link member of the chain embodying this invention.

Figure 1:
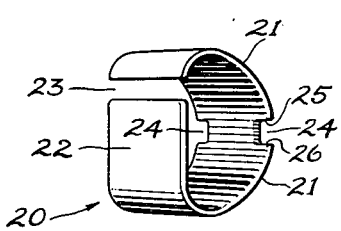

In Fig. 1, reference numeral 20 designates a link member constructed of flexible sheet material and provided with a transverse semicircular portion 21, having a radius of curvature substantially equal to the radius of a standard roller chain roller of equivalent size. Each end of the semicircular portion curves into the plane of an integral flat portion 22, with a transverse gap 23 at one end thereof, and each semicircular edge is provided with a notch 24, at the center of its circumferential length.

Figure 2:
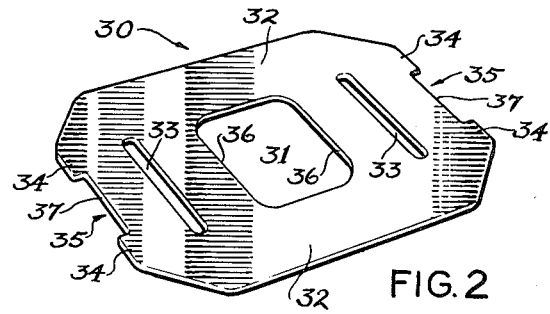
Fig. 2 is a perspective view of a flexible link member that interconnects with link members of the type illustrated in Fig. 1.

In Fig. 2 reference numeral 30 designates a substantially rectangular flat link member, similarly constructed of flexible sheet material and provided with apertures 31 and 33 extending transversely between longitudinal side portions 32. The longitudinal spacing of the apertures 33 determines the pitch dimension of the chain. Extended end portions 34 form a shallow notch 35 at each end of this member.

Figures 3, 6:
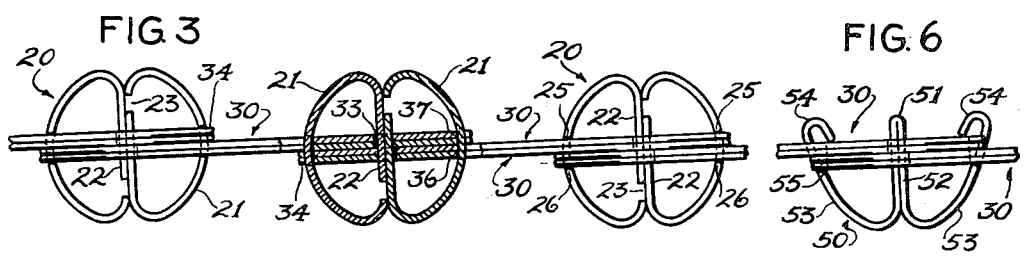
Fig. 3 is a partly sectioned side elevational view on the line 3—3 of Fig. 4, of a portion of a flexible link chain assembled from link members of the type illustrated in Figs. 1 and 2.
Fig. 6 is a fragmentary side elevational view of the chain of this invention using a modified form of the interconnecting link member shown in Fig. 1.
Figures 4, 7:
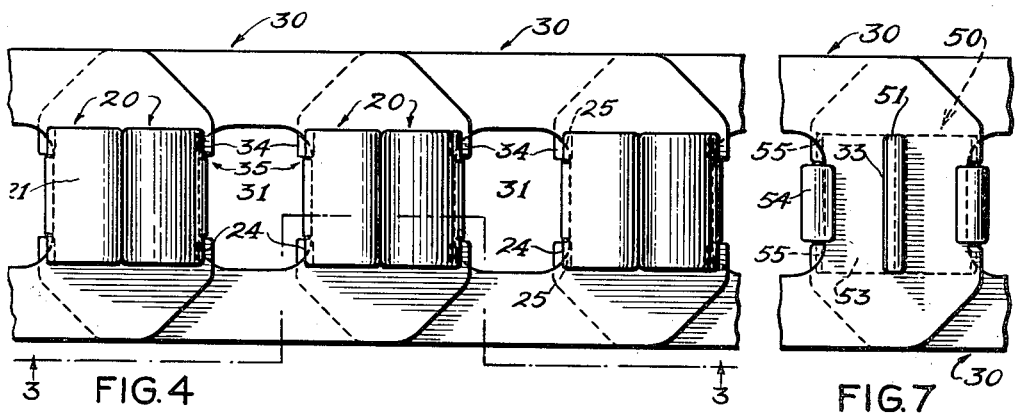
Fig. 4 is a plan view of the portion of the assembled chain illustrated in Fig. 3.
Fig. 7 is a plan view of the construction illustrated in Fig. 6.

Figs. 3 and 4 show how these members are interconnected to form the chain of the present invention. It will be remarked that Fig. 3 shows two superimposed flat link members 30, per pitch length of the chain, but it is to be understood that either one or more than two may be used per pitch length if desired; two or more being considered preferable in the interests of reliability, flexibility and strength proportionate to the other parts of the chain structure.

The flat link members are arranged end to end with overlapping end portions and registering apertures 33. To interconnect them the semicircular interconnecting link members 20 are initially located in the apertures 31, with their gaps 23 adjacent to and aligned with the overlapped portions. Moving the semicircular members toward the registering apertures 33 enables insertion of their flat portions 22, in these apertures. The notches 24, of the semicircular portions, simultaneously engage the superimposed end portions 34 and adjacent rounded corners of the apertures 31 of the flat link members, holding them together at these points; the resilient properties of the semicircular members facilitating such insertion and notched engagement, and ensuring the flexible retention of these parts in this position. The flat link members are thus positively interconnected and substantially locked against a longitudinal pulling force.

It should be noted that the portions of the semicircular link members extending transversely between the notches 24, and assembled as described above, bear simultaneously against a transverse edge 37 of the notched ends of the flat link members and a transverse edge 36 of the apertures 31. By this means the semicircular portions respective additional resilient support against working pressures that may be applied externally normal thereto.

It should further be noted that the semicircular link members assemble in pairs, with flat portions 22 in contact, the resulting opposed curved portions having a common center with an effective diameter substantially equal to the roller diameter of a standard roller chain of equivalent pitch. These members are also shown assembled with the gaps 23 of adjacent flat portions appearing above and below the plane of the flat link members. This arrangement is not essential, but is preferable in that the minor structural discontinuity resulting from the gap is more effectively supported by the uninterrupted flat surface of an oppositely turned adjacent member.

As clearly shown in the cross-sectioned part of Fig. 3, and as noted above, the flat portions, in extending through the registering apertures of the flat link members, lock them securely against a longitudinal working pull. It should be remarked that this locking feature embodies a substantial increase in power transmission capacity over prior flexible link chain proposals, which relied largely on the elastic strength of the curved link portions alone, to withstand a working pull on the chain.

From further consideration of the cross-sectioned portion of Fig. 3, it will be apparent that a working pull transmitted through each overlapping link member is necessarily offset by the distance between the neutral axes of each overlapped portion. This results in a small unbalanced force tending to rotate the assembly about its geometrical center. This force is effectively counterbalanced, however, by the longitudinally spaced restraint imposed equally on each side of the center by the notched edge engagement of the semicircular and flat link members.

The restraint imposed at these points serves an important dual purpose in that in addition to stabilizing the overlapped joint assembly, as described above, it maintains substantially uniform link flexure when the chain is engaging a drive sprocket at the sprocket pitch circle.

Figure 5:
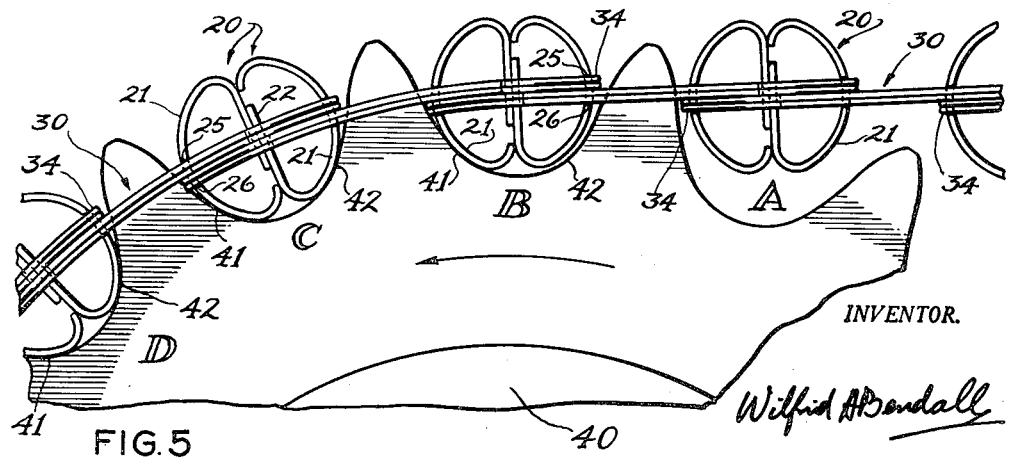
Fig. 5 is a fragmentary side elevational view of the chain of Figs. 3 and 4 engaging a drive sprocket of American Standard tooth form.

Reference to Fig. 5, where the chain is shown engaging a standard roller chain drive sprocket, illustrates the foregoing and other advantageous features of the flexible link chain drive. The sprocket, designated by reference numeral 40, is assumed to be rotating in the direction indicated by the arrow. At position A, in the straight or drive strand portion of the chain, the semicircular link members which engage the sprocket teeth are entering the sprocket tooth gap. At position B, the approximate point of drive strand center line tangency to the sprocket engagement pitch circle, one of the semicircular members is in supporting contact with the sprocket tooth gap at 41 and the other is about to seat therein at 42. At C and D, past the point of drive strand tangency, seating is completed and the semicircular link members are in full chain supporting and driving engagement with the sprocket teeth at both 41 and 42.

It will be seen that the chain engagement action with the sprocket teeth is almost purely flexural and that it conforms to a substantially circular pitch line on the sprocket. There is no articular, or independent swinging action of the links, such as obtains with rigid link chains. Furthermore, it should be noted that the apertured link members, between positions B and C for example, exert a substantial spring force acting radially outwards and supporting the engagement phase between positions A and B. The spring force of the links thus effectively inhibits destructive impact with the sprocket teeth. As engagement proceeds at position B, the semicircular interconnecting link portion 21, in initial supporting contact with the sprocket tooth gap at 41, flexes slightly to permit complete seating of the assembly at 42. Power transmission is thereby accomplished with negligible chain and sprocket engagement impact and friction and the mechanical efficiency of the drive is high.

Another important respect in which the flexible link chains of the present invention improve upon the rigid link chains generally and the standard roller chain particularly, is in their considerably more resilient, and thus more effectively distributed, total working engagement with the drive sprockets. As will be apparent from Fig. 5, a line through the pitch centers of the chain on the sprocket, coinciding substantially with the sprocket pitch circle and representing the line of working pull thereon, will lie outside a line through the sprocket and chain link tooth contacts, located in the region of the reference numerals 41 and 42, where the semicircular link portions 21, bear against the sprocket teeth. Since the working surface of these link portions is circularly tangent to the sprocket tooth surface at the working contacts, the resulting drive engagement is through a series of such resilient tangential contacts. A working load is thus, in practical effect, transmitted through a series of cantilevers, extending between a pitch line through the tooth contacts and a pitch line through the chain centers, and can thus effectively accommodate drive shock and misalignment conditions.

Fig. 5 also illustrates the use of the notched edge engagement of the semicircular and flat link members in ensuring substantially uniform flexure of the latter when the chain engages drive sprockets. As shown at position B, for example, the free ends 34, of the topmost flat link members are held to a constant drive pitch radius by their bearing against the upper notch surfaces 25 of the semicircular member. The latter, in turn transmit the curving flat link spring force to the lower edge 26, of the notch, in contact with the underside of the overlapped flat link member extending from B to A. The full spring force of the flat link members is thus utilized to aid in controlling engagement with, and supporting the chain on, the drive sprocket. Maintaining the flat link members thus, in continuous flexural contact, also contributes to the inherent vibration damping ability of the laminated flexible chain structure.

Figures 6 and 7 illustrate a structural modification of the semicircular interconnecting link member, embodying certain installation and manufacturing advantages. While the ability of the standard roller chain and of the flexible link chain of the present invention to engage sprockets with either side of the chain is a valuable feature inherent in their symmetrical design, a substantial number of drive installations require sprocket engagement with only one side of the chain. It is further desirable that the construction of this chain be conveniently adapted to high speed automatic machine assembly. The modification illustrated in Figs. 6 and 7 will be found advantageous in the light of these requirements.

In these figures, the W-shaped interconecting link member 50, is formed from a single strip of flexible sheet material with a transverse center fold 51, to provide the flat doubled center portion 52. The doubled thickness of the latter is divided at its base, each divided part being turned outwards to form symmetrically opposed transversely curved portions 53, with a curvature substantially conforming to the sprocket tooth gap curvature of standard roller chain drive sprockets of the required pitch size. These curved portions continue upwards and blend into hook-shaped extensions 54, of narrower transverse width which may also be utilized to provide reversed chain curvature sprocket engagement means on the opposite side of the chain if desired.

As shown in Fig. 6, the modified interconnecting link members described above will readily assemble from one side of the superimposed flat link members 30, disposed end to end, with overlapped ends and registering apertures 33, as described for the prior construction herein. Whether assembled mechanically or manually the flat center portion readily enters the apertures 33, while the hook-shaped extensions simultaneously spread to enter the adjacent apertures 31 and snap over the overlapping flat link ends at one end and the transverse edge of an aperture at the opposite end of the overlapped portions of the flat link members. Control of the offset loading and maintenance of the flexural conformity of the flat link members, when engaging a sprocket, is ensured in this case by their retention between the shoulders 55 and the hook-shaped extensions 54.

Flexible link chains of the types described herein may be readily assembled manually or automatically, in various lengths, and can be manually detached without tools by merely springing the curved portions of the interconnecting link members out of their notched edge engagement and the flat portions out of the flat link apertures. Such disassembly also is conveniently accomplished without changing the sprocket center distance of an installed drive.

While the modified interconnecting link member 50, in Figs. 6 and 7, is shown and described as a one-piece member, it may obviously be constructed of two or more pieces if manufacturing convenience dictates. Similar reasoning applies to the construction shown in Figs. 1 to 5, where the semicircular link members 20, may conversely be of unit construction, similar to that of the modified member of Fig. 6.

The curved portions 21 and 53, may also be other than semicircular in shape, to vary the sprocket engagement characteristics. The link members, in whole or in part, may be coated or lined with various materials to better enable them to withstand wear and corrosion, provide insulation or facilitate durable dry-lubricated operation on the drive sprockets.

Such structural variations are cited to emphasize that the present invention is not limited to the embodiments shown herein by way of example, but is capable of numerous modifications of shape, size, ararngement and processing of the cooperating parts without departing from the spirit of the invention or the scope of the appended claims.

I claim:

1. A chain comprising links of flexible sheet material disposed end to end with overlapping end portions, each of said links having a transverse central aperture and a transverse aperture at each end portion, said links being arranged with registering apertures at said end portions and being interconnected by links of like flexible material having transverse flat portions passing through the registering apertures and transverse curved portions passing through adjacent central apertures and engaging the edges of said apertures.

2. A chain comprising links of flexible sheet material each of said links being constructed with a plurality of apertures, said links being disposed end to end with overlapping end portions and registering apertures in said end portions, and interconnecting links of like material with portions passing through said registering apertures locking said links against tensional pull and portions passing through adjacent apertures locking edge portions of said links and holding said end portions in substantially continuous flexural contact with each other.

3. A chain comprising apertured links of flexible sheet material and D-shaped interconnecting links of like material comprising a substantially semicircular portion defining the curved portion of said D-shaped links and a flat portion defining the diameter thereof, said flat portion being interrupted to provide an assembly aperture permitting insertion of said flat portion in the apertures of said apertured links, said D-shaped links being assembled in pairs with the flat portions adjoining each other and passing through the apertures of said apertured links and locking them against tensional pull.

4. A chain comprising apertured links of flexible sheet material interconnected by substantially W-shaped links of like material with the center portion of the W-shape pressed together and the outer portions thereof curving outwardly away from said center portions and terminating in extended hook-shaped portions, said center and outer portions being shaped to permit sprung insertion and resilient retention thereof in the apertures of said apertured links.

5. A chain comprising links of flexible sheet material provided with a plurality of longitudinally spaced transverse apertures and interconnecting links of like material having a plurality of transverse portions passing through and engaging the transverse edges of said apertures, the edges of said transverse portions being notched to intersect longitudinal edges of alternate apertures and hold said links in substantially continuous flexural contact with each other.

6. A chain comprising apertured links of flexible sheet material with central and end link apertures and interconnecting links of like material having central and end link portions, said central portions of the interconnecting links passing through said end apertures and said end portions passing through said central apertures and holding said links in flexural contact with each other.

7. A chain comprising links of superimposed layers of flexible sheet material each having a central and end apertures, said links being disposed end to end with overlapping end portions and registering apertures in the end portions, and interconnecting links of like material each having a portion passing through a central link aperture and a portion passing through an end aperture.

8. A sprocket engaging chain comprising links of flexible sheet material having central and end apertures said links being disposed end to end with overlapping end portions and registering apertures in said end portions, and sprocket engaging interconnecting links of like material each having a portion passing through said registering apertures and a sprocket engaging portion passing through a central aperture.

9. A sprocket engaging chain comprising links of flexible sheet material having central and end apertures, said links being disposed end to end with overlapping end portions and registering apertures in said end portions, and sprocket engaging interconnecting link members each having a link interconnecting portion passing through a registering aperture and a sprocket engaging portion passing through a central aperture.

10. A sprocket engaging chain comprising apertured links of flexible sheet material disposed end to end with overlapping end portions and registering apertures in said end portions and having a central aperture for clearing a sprocket tooth, and sprocket engaging interconnecting link members each having a link interconnecting portion passing through a registering aperture and a sprocket engaging portion passing through a central aperture.

References Cited in the file of this patent

UNITED STATES PATENTS

| | | |
|---|---|---|
| 67,100 | Brinkerhoff | July 23, 1867 |
| 310,104 | Wilson | Dec. 30, 1884 |
| 452,122 | Kotter | May 12, 1891 |
| 593,872 | Barnhart | Nov. 16, 1897 |
| 1,202,773 | Bandur | Oct. 31, 1916 |
| 1,437,655 | Hatch | Dec. 5, 1922 |
| 2,005,841 | Kulp | June 25, 1935 |
| 2,062,115 | Bendall | Nov. 24, 1936 |

FOREIGN PATENTS

| | | |
|---|---|---|
| 200,832 | Great Britain | Oct. 13, 1924 |
| 308,635 | Great Britain | Mar. 22, 1929 |
| 562,910 | Great Britain | July 20, 1944 |